Feb. 8, 1966  MASAHARU MASUDA ETAL  3,234,068
DEVICE FOR POLISHING GLASS

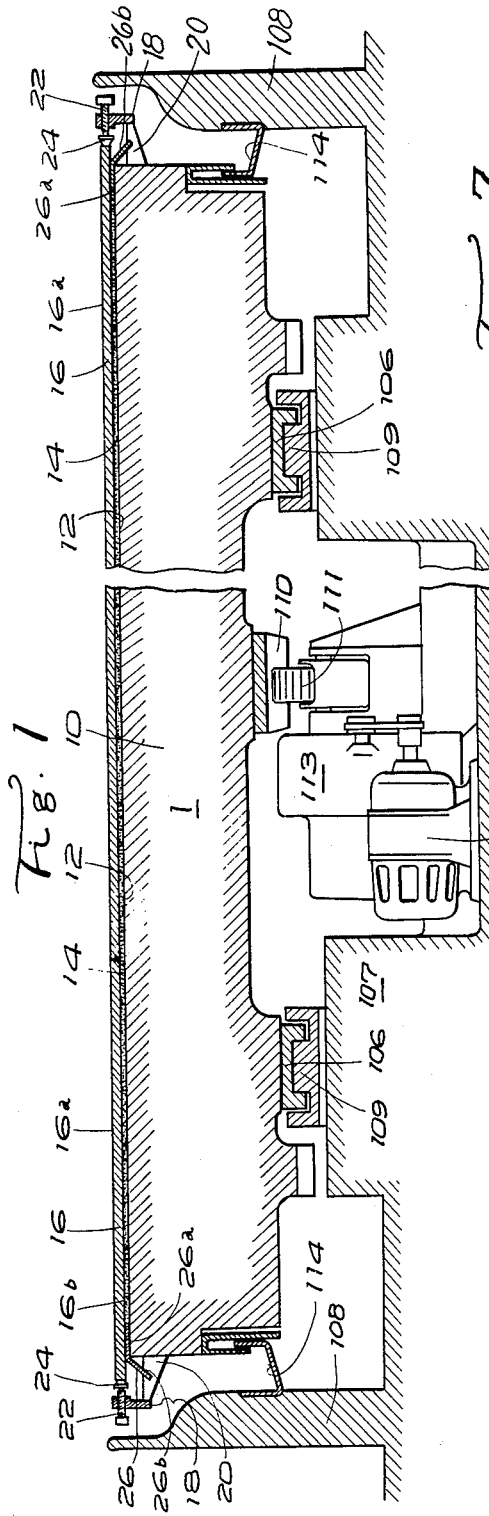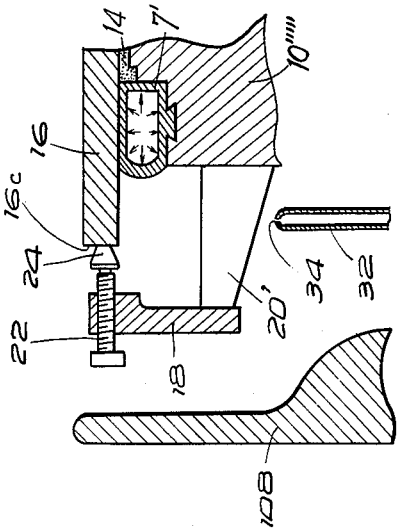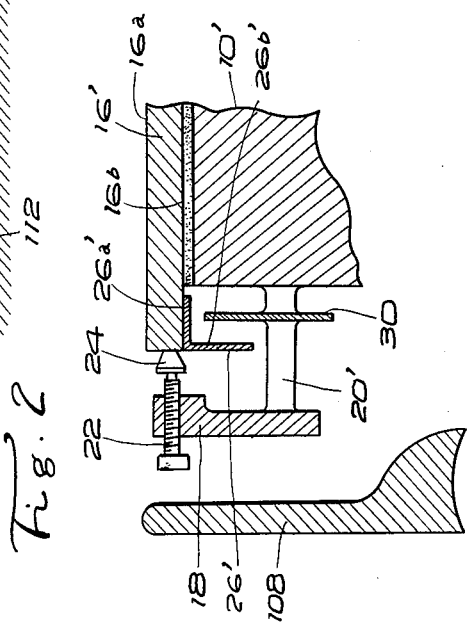

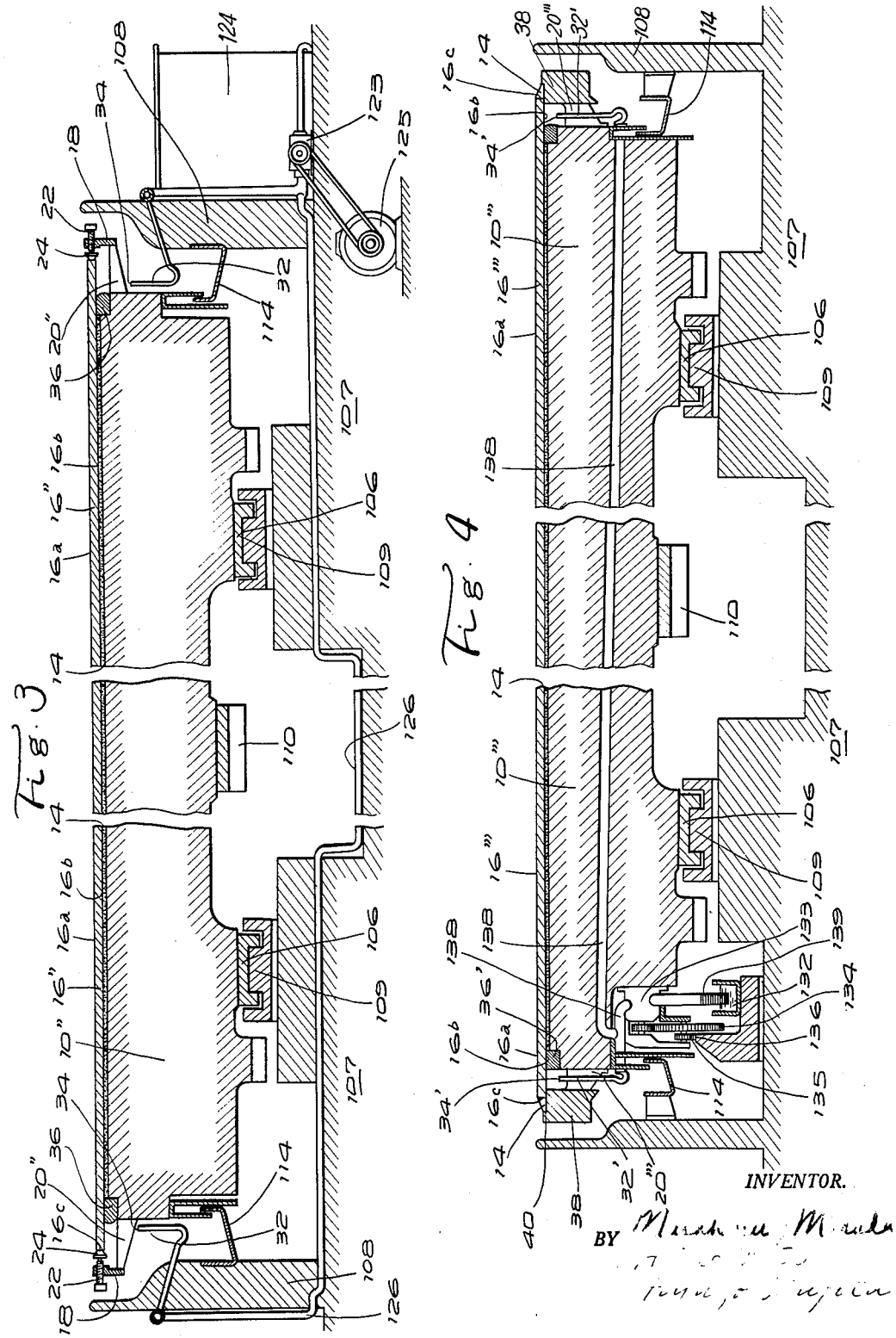

Filed Nov. 13, 1962  7 Sheets-Sheet 3

INVENTOR.

BY Masaharu Masuda

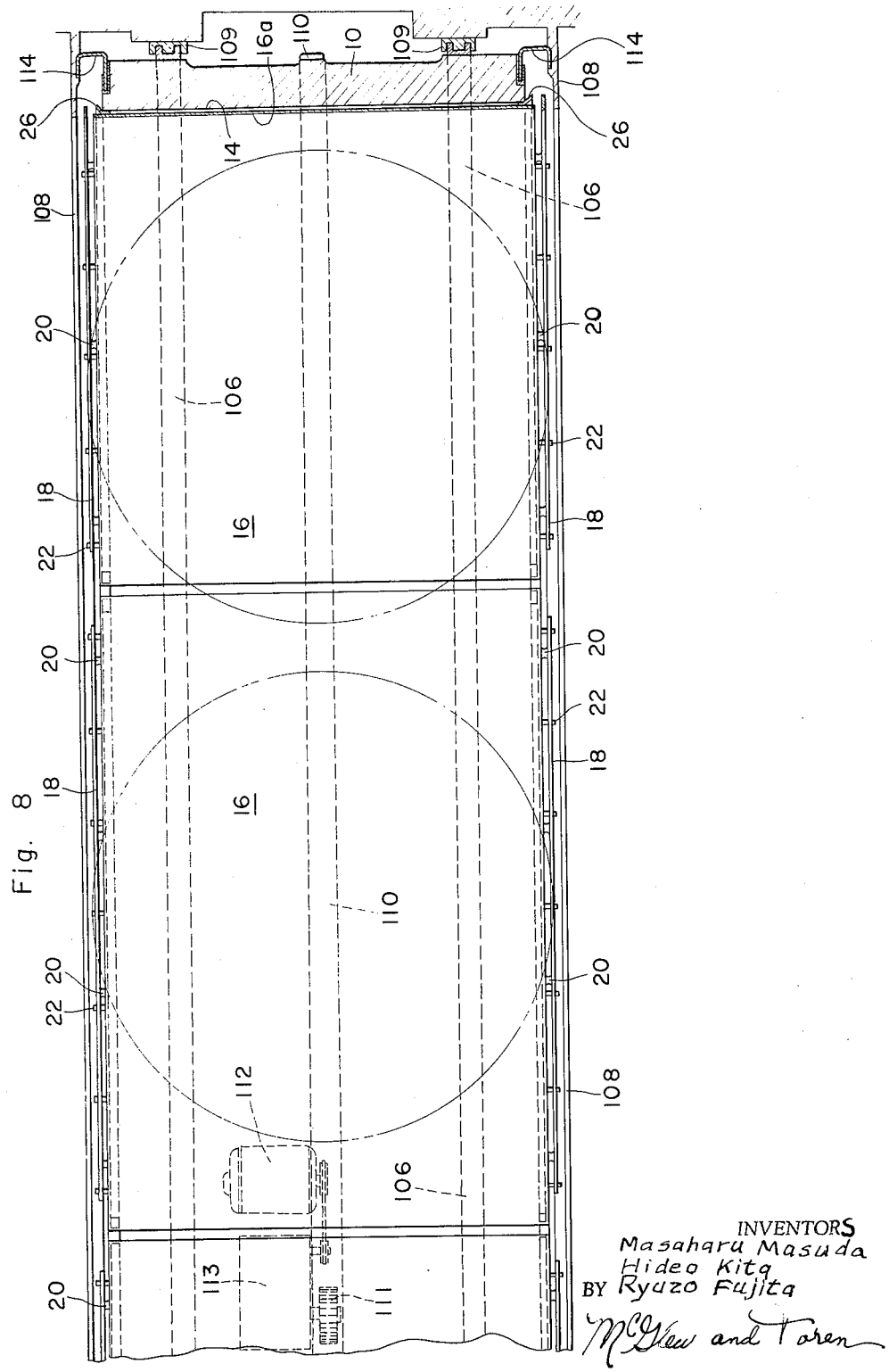

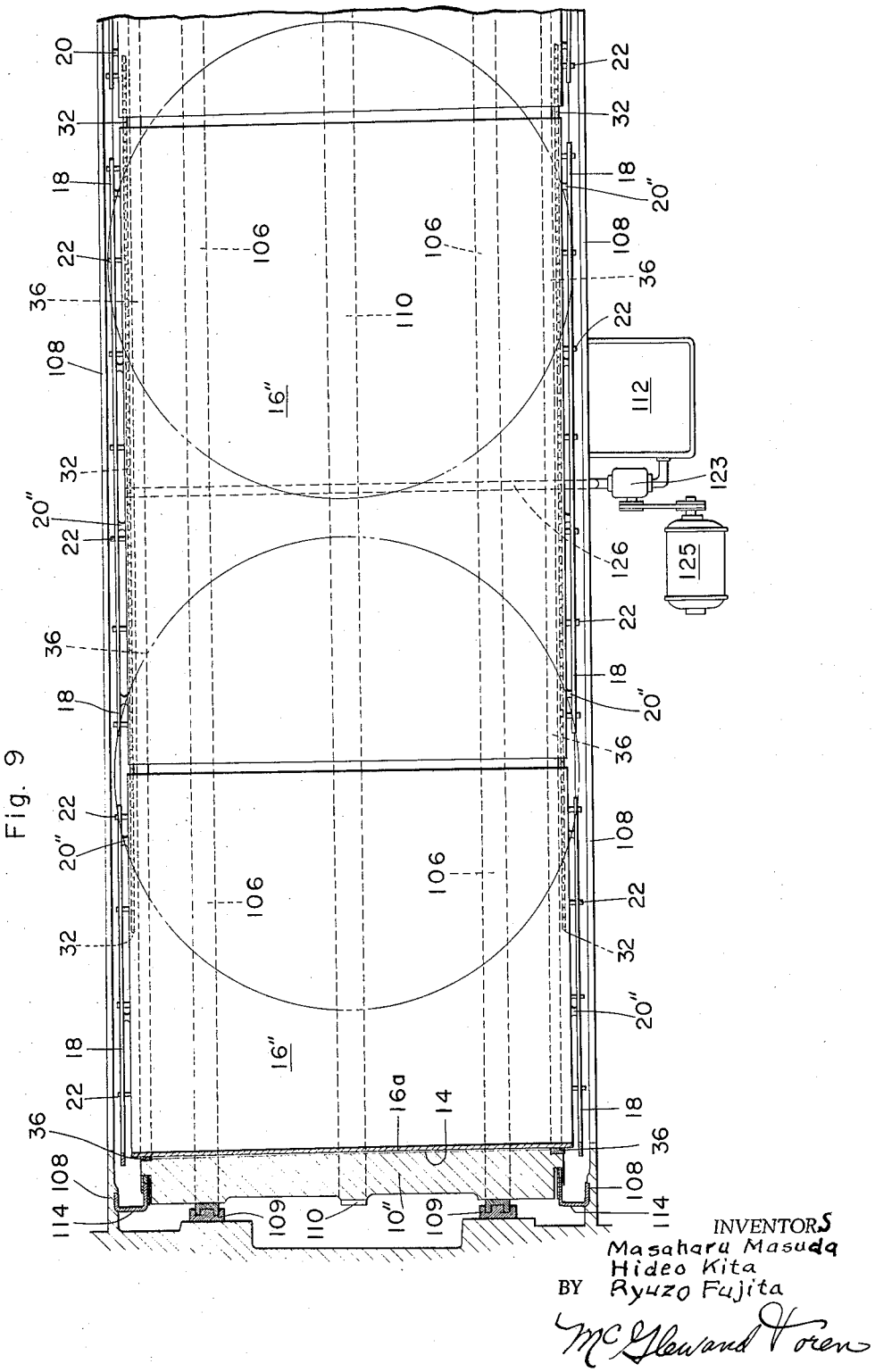

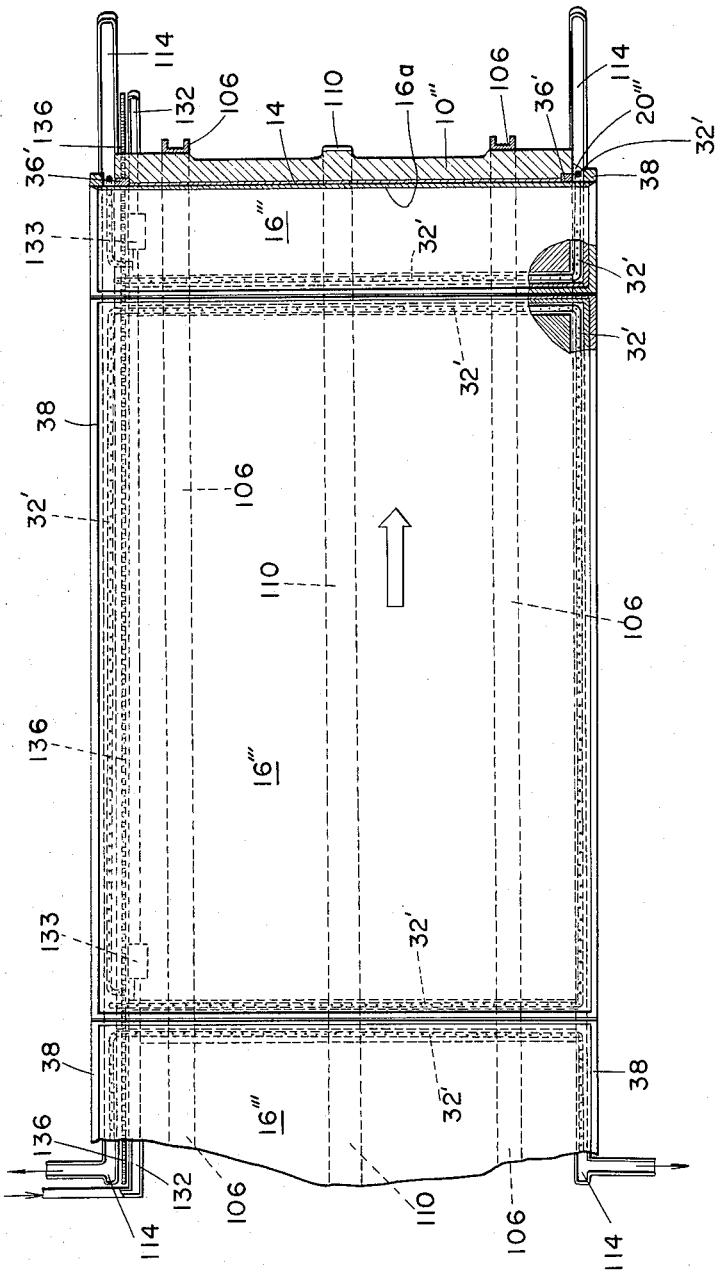

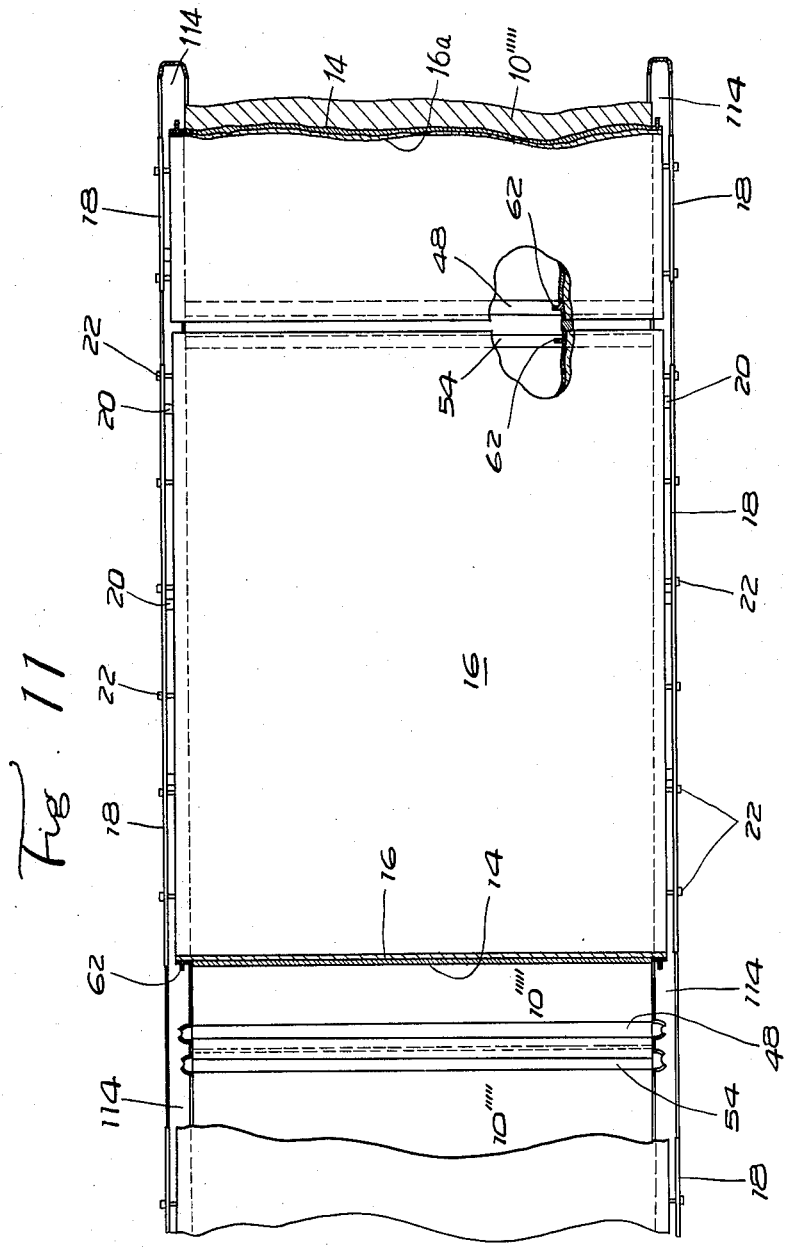

United States Patent Office 3,234,068
Patented Feb. 8, 1966

3,234,068
DEVICE FOR POLISHING GLASS
Masaharu Masuda, Hideo Kita, and Ryuzo Fujita, Amagasaki, Japan, assignors to Nippon Sheet Glass Co. Ltd., Osaka, Japan, a corporation of Japan
Filed Nov. 13, 1962, Ser. No. 236,835
Claims priority, application Japan, Nov. 11, 1961, 36/40,964
8 Claims. (Cl. 156—345)

This invention relates in general to a device and method for polishing glass and similar materials, and in particular to a new and useful method of polishing glass employing chemical polishing means for application to a single surface wherein the glass is mounted on means which will protect the opposite surface from the chemical, with means for insuring that the edges of the glass are not contaminated with the chemical cleaner, and to an improved apparatus for carrying out the method.

Prior to the present invention, glass surfaces were cleaned by first roughening a surface thereof mechanically and thereafter finely polishing the surface with a very fine abrasive material. Where chemicals were employed for roughening the glass surface, great difficulty was encountered in assuring that the chemicals would not affect areas which were not to be polished, such as, for example, the opposite face of the glass.

In accordance with the present invention, it has been found possible to provide a method for chemically preparing the surface of glass for polishing, by providing means for mounting the opposite surface of the glass in a manner preventing its contamination by the chemicals and by providing an improved deflection means for insuring that the edges of the glass are protected from the chemicals.

Accordingly, it is an object of this invention to provide an improved device for chemically polishing glass which includes means for deflecting chemicals away from the edges of the glass and preventing the penetration of the chemicals into the surface of the glass not being polished.

A further object of the invention is to provide an improved method for polishing glass, which includes placing the glass on a surface such as plaster with the surface to be polished facing up, and installing an angle-shaped plate or drain deflector along the edges of the glass to be polished between the plaster and the surface which is not to be contacted by chemicals, so that the plate will deflect all chemicals away from the surface which is protected.

A further object of the invention is to provide an improved device for polishing glass which includes a table element upon which plaster may be formed for the receipt of a sheet of glass to be polished with the side thereof which is not to be polished arranged to face the plaster and including deflection means comprising an angled sheet arranged at the edges of the glass in contact with the surface to be protected and a further deflector plate for insuring that the chemicals do not contact the undersurface of the glass sheet.

A further object of the invention is to provide an improved means for polishing glass which includes a table having recesses defined therein adjacent the locations where the edge of a sheet of glass is to be positioned for polishing purposes, and including deflection means in the recess for deflecting away the chemicals so that they will not contact the undersurface of the sheet of glass.

A further object of the invention is to provide a device for polishing glass which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIGS. 1 to 4 are longitudinal sections through a polishing truck constructed in accordance with the invention;

FIG. 7 is a view similar to FIGS. 1 to 4 of another embodiment of the device;

FIGS. 8, 9 and 10 are plan views, partly in section, of the embodiments of the invention shown in FIGS. 1, 3 and 4, respectively; and, FIG. 11 is a plan view, partly in section and partly broken away, illustrating features of the embodiment shown in FIG. 6.

Figure 5:
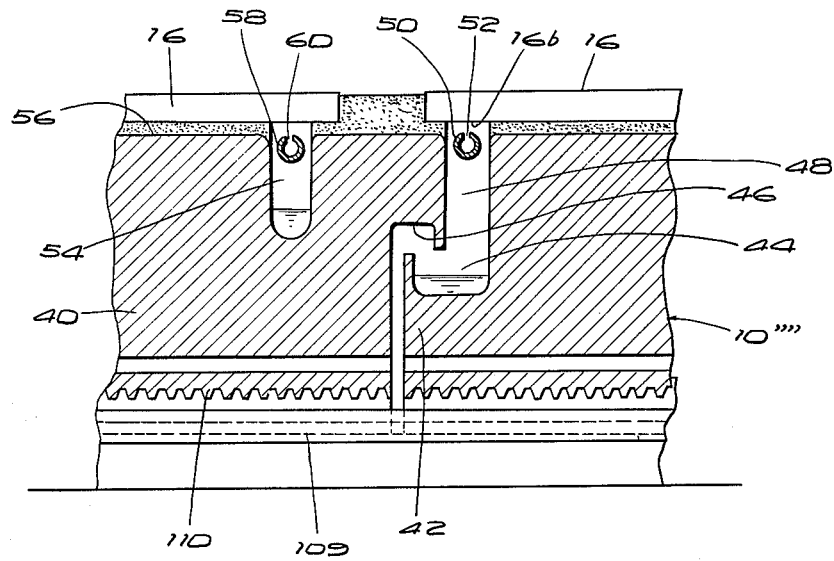
FIGS. 5 and 6 are sections similar to FIGS. 1 to 4 but indicating a portion of the device adjacent the center of the back edge of a sheet of glass which is to be polished.

Referring to the drawings in particular, the invention embodied therein includes a polishing truck generally designated 10 upon a top surface 12 of which is spread a layer of plaster 14. A sheet of glass 16 to be polished is positioned to overlie the plaster 14 and to become somewhat stuck thereto. A top surface 16a of the glass which is to be polished is directed upwardly whereas a surface 16b which is to be protected is arranged in contact with the plaster 14.

A pusher frame 18 is separated from the main portion of the truck 10 by means of an arm 20 and it is provided with a threaded pusher element 22 having a frusto-conical end 24 which bears against an edge of the glass sheet 16. The pusher element 22 is adjusted to regulate the end of the sidelong movement of the sheet of glass 16a but to permit the truck 1 to move so that the upper side of the sheet of glass will be polished by an appropriate polishing tool and chemical abrasive (not shown).

In accordance with the invention, a deflection device generally designated 26 is provided which is substantially L-shaped. The deflection device includes a leg portion 26a which is arranged along an edge of the glass in contact with the surface 16b on one side and the plaster 14 on its opposite side, and having a leg portion 26b extending so downwardly at an angle for deflecting chemicals and abrasive material employed on the top surface 16a outwardly away from the surface 16b. In the embodiment of FIG. 1, the deflecting device 26 comprises an L-shaped plate of a material which can not be corroded by chemical abrasives and its horizontal leg 26a is tightly embedded in the plaster 14. The oblique leg 26b advantageously extends downwardly at an angle from the edge of the glass and any liquid abrasive which flows over the top edge 16a will be led away by the leg 26b and discharged without corroding the back portion of the sheet of glass.

The polishing action which is carried out for the surface 16a of the glass includes the use of liquid chemical abrasives principally composed of hydrofluoric acid, fluorides or acid fluorides which chemically act on glass. Since the glass and the plaster do not closely adhere to each other, it is impossible to depend solely on the plaster for insuring that the interior surface 16b of the glass is not acted upon by the chemicals. Thus, the deflector 26 is applied all around the peripheral edges of the glass sheet so that the chemicals employed will not permeate around the edge and underneath the surface of the glass being treated. The efficiency of the device is particularly applicable in those cases where the back of the glass sheet, that is the surface 16b, has already been previously polished in a preceding polishing operation.

In conventional processes of polishing sheet glass, both sides of the glass are first roughened employing relatively coarse grained abrading material such as silica and the like in order to provide roughened surfaces with grooves extending parallel. Thereafter, minute grained abradants such as Indian red and the like are employed for polishing the roughened surfaces. A disadvantage of the prior art method is that the polishing work is inefficient and although the volume of the glass removed is far smaller than that by the roughening work, the polishing equipment and the power of the polishing motor is equal to or even greater than for the roughing work. For the present method, however, chemical abrasives mainly composed of hydrofluoric acid, fluorides or fluoride acid which chemically act on glass are employed and the polishing is expedited by the improved deflection means set forth herein.

In FIG. 2, a slightly modified arrangement is employed which includes a truck 10' and a web element 20' extending therebetween which carries a deflection plate 30. In addition, a deflection plate 26 is employed which is right angular so that a lower leg 26b' is arranged to cooperate with the deflection plate 30 to insure that no materials permeate into the under interior surface 16b of the glass. In the embodiment of FIG. 2, the glass 16' is positioned on the truck 10' with its edge extending outwardly therefrom against a stop 24.

In FIG. 3, another embodiment is indicated in which the edge of sheet glass 16" is arranged to extend far beyond the edge portion of the polishing truck 10". The same stop member 18 is provided which is spaced outwardly from the truck 10" by a web 20". The means for deflecting the chemical cleaning surface away from the undersurface 16b in the embodiment of FIG. 3 includes a conduit 32 having top opening 34 through which a liquid such as water is directed outwardly against the plate glass 16" in the vicinity of an edge 16c thereof. In some instances, a fluid such as air may be employed rather than water in order to insure that the chemicals used in treating the top surface 16a are blown or directed away from the undersurface 16b. In this embodiment, it is advantageous to provide a rubber insert 36 arranged along an upper corner of the truck 10". Plaster 14 is applied to the top surface of the truck 10" as in the other embodiments.

In the embodiment of FIG. 4, a side member 38 is provided instead of the stop member 18 and it is separated from a truck 10''' by a web 20''' which carries a conduit 32' having an opening 34' for directing liquid against the undersurface of a sheet of glass 16''' in the vicinity of an edge 16c. In this embodiment, the stop member 38 has a notched corner area 40 which is filled with plaster 14 so that there is little likelihood that any chemical will be directed over the top surface 16a to the bottom surface 16b of the glass 16'''. The conduit 32' may be provided in the embodiment of FIG. 3 in order to insure that the undersurface 16b is maintained clean at all times. In this embodiment, it is a simple manner to cause the plate glass 16''' to adhere to the top of the truck over the plaster layer 14.

Figure 6:
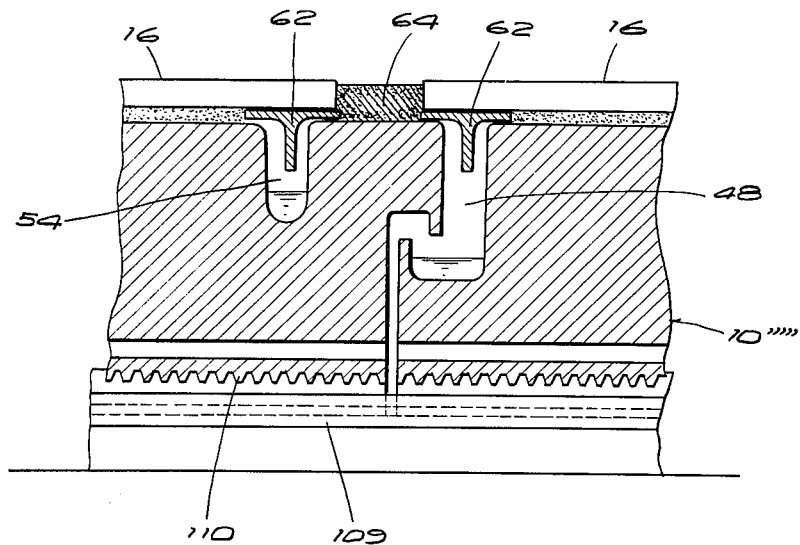

In FIGS. 5 and 6 there is indicated a proposed construction for the central portion of a truck 10 which includes separated elements 40 and 42 which have substantially U-shaped notched corners 44 and 46, one of which 44 opens upwardly and the other of which 46 opens downwardly so that they may be placed together complementarily as indicated in FIGS. 5 and 6. This arrangement is provided for preventing the liquid abrasives and chemicals from permeating to the center the back surface of 16b of the sheet glass 16, from the front and rear edge portions of the sheet glass in respect to its direction of movement. The connecting truck portions 40 and 42 at the location of the recesses 44 and 46 form a recess 48 in which is positioned a conduit 50 having top openings 52 through which a liquid or other fluid is blown against the undersurface 16b of the sheet glass 16.

An additional recess 54 of U-shaped configuration is formed in a top surface 56 of the truck 40, and it carries a conduit 58 having an opening 60 through which the liquid is directed against the undersurface 16b of the glass 16.

In FIG. 6, drain plates 62 are provided in place of the deflecting means comprising the conduit 58 of FIG. 5. The drain plates 62 are disposed in recesses 54 and 48, respectively. In some instances, a resilient spacing element 64 is also provided at the location indicated.

The invention has been described in reference to embodiments in which sheet glass is loaded onto a polishing truck. The invention, however, may be utilized in those instances where the sheet glass is loaded on any other supporting device or conveyor. The invention thus, in its broad concept, includes means for deflecting chemicals and abrasive materials which are employed in polishing one face of a glass to insure that such chemicals and abrasives do not contact the opposite face. In some instances, it is desirable to apply a vacuum in the vicinity of the element 36, for example, to insure that this element is tightly adhered to the undersurface of the sheet so that complete isolation of the surface from any contaminating fluid is assured.

In FIG. 7 a modified arrangement similar to FIGS. 3 and 4 is provided which includes a truck 10''''' which carries a resilient member 7' which is provided with means for directing fluid into the member for causing the expansion thereof into tight engaging contact with a sheet of glass 16 which is arranged over plaster 14 adjacent the edge of the resilient member 7' as in the other embodiments. Web 20' is provided as in the embodiment of FIG. 3 along with conduit 32 and discharge opening 34. A stop member 18 is also provided as in the embodiment of FIG. 3.

Referring particularly to FIGS. 1 and 8, table 10 is mounted for sliding lengthwise along parallel rails 109, 109 on foundation or floor 107, the table being guided along these rails by suitable guide means, such as shoes 106 extending lengthwise and parallel to one another adjacent opposite sides of table 10. A rack 110 extends longitudinally of the underside of table 10, substantially centrally thereof, and meshes with a pinion 111 which is rotatably supported on foundation or base 107 and is driven by a motor 112 through the medium of a gear reducer 113. A gutter 114, which is mounted on a frame or base portion 108, extends longitudinally of table 10 and acts as a lower closure for the gap between the side edges of table 10 and the frame portions 108. As the table 10 is advanced by motor operation of pinion 111 meshing with rack 110, the polishing solution draining from deflector plates 26 is collected in gutters 114 and discharged in any suitable manner.

Referring to FIG. 9, and again to FIG. 3, which show preferred embodiments of the present invention, water spouts 32 communicate with a pipe 26 which, in turn, is in communication with the bottom of a tank 124 mounted on frame or foundation 107, through the medium of a pump 123. Pump 123 is operated by a motor 125, as through the medium of a belt or chain drive. With this arrangement, the solution in tank 124 is, through the medium of pump 123, discharged as jets through water spouts 32 to which the pump is connected by piping 126. These jets are directed against the projecting peripheral portions of under surface 16b of the plate glass 16 as the latter is moved along by table 10.

In the embodiment of FIGS. 4 and 10, piping 138 connects nozzles 34' to the pressure side of a pump 133 installed adjacent the lateral edge of table 10'''. A gear 135 is rotated with the drive shaft of pump 133 through a gear 134, and gear 135 meshes with a rack 136 on foundation 107. Also mounted on the foundation is an open top gutter 132, positioned below pump 133 and extending along the direction of movement of table 10'''. A flexible pipe 139 is disposed in this gutter and is connected to the inlet or suction end of pump 133. Thereby, as table 10''' travels longitudinally, stationary rack 136 drives pump 133 through the meshing gears 134 and 135, so that liquid in gutter 132 is continuously drawn through flexible pipe 139 into pump 133 and discharged under pressure to piping 138.

This liquid is jetted under pressure from nozzles 34' against the undersurface of glass plate 16'''. It should be understood that, when table 10''' travels out of the working zone, the flexible pipe 139 easily rides out of the gutter 132 and, at this point, due to the absence of stationary rack 136 secured to the foundation, pump 133 automatically ceases to operate. If desired, it is also possible to allow the jet discharge liquid to be freely drained through the gaps bewteen the table and the foundation and return to the gutter 132.

The present apparatus may utilize a polishing means such as shown and described in our copending U.S. patent applications Serial No. 232,408 and Serial No. 232,441. The circles shown in broken lines in FIGS. 8 and 9 indicate the contours of the polishing tools.

While specific embodiments of the invention have been shown and described in detail to illustrate the application of the inventive principles, it will be understood that the invention may be embodied otherwise without departing from such principles.

What is claimed is:

1. In apparatus for polishing glass sheets by subjecting a surface of a glass sheet to the action of a chemical polishing liquid coacting with a polishing tool, the improvement comprising a truck having a substantially flat upper surface for receiving and engaging the undersurface of a substantially flat sheet of glass to be polished thereon, with the surface of the glass to be polished directed upwardly and with peripheral portions of the glass sheet projecting beyond edges of said top surface; a supporting floor, support means on said supporting floor supporting said truck for displacement longitudinally of a working path, and deflecting means for deflecting polishing liquid, draining from the upper surface of a glass sheet supported on said top surface of said truck over the side edges thereof, from contacting the undersurface of the glass sheet engaging said top surface of said truck, said deflecting means including nozzle means positioned and arranged to direct a cleaning liquid jet against the undersurface of the peripheral portions of the projecting peripheral portions of said glass sheet to wash polishing liquid off the latter.

2. In apparatus for polishing glass sheets, the improvement defined in claim 1, wherein said deflecting means further includes a resilient liquid-sealing element clamped between said top surface of said truck and the undersurface of a glass sheet thereon and extending along the edges of said top surface of said truck.

3. In apparatus for polishing glass sheets, the improvement defined in claim 1, wherein said nozzle means is supported on said floor.

4. In apparatus for polishing glass sheets, the improvement defined in claim 1, in which said nozzle means is mounted on said truck.

5. In apparatus for polishing glass sheets, the improvement defined in claim 1, in which said deflecting means further includes a liquid discharge gutter supported on said floor beneath the projecting peripheral portions of the glass sheet.

6. In apparatus for polishing glass sheets, the improvement defined in claim 1, said nozzle means being positioned in a liquid discharge gutter formed in the truck beneath said projecting peripheral margins of the portions of the glass sheet, and a second liquid discharge gutter supported by said floor beneath said first mentioned discharge gutter, said first mentioned discharge gutter having a discharge opening directed toward said second liquid discharge gutter.

7. In apparatus for polishing glass sheets, the improvements defined in claim 4, said deflecting means further including a pump mounted on said truck, driving means for said pump including intermeshing gear means on said truck and on said floor for operating said pump responsive to movement of said truck along said working path, a washing liquid supply gutter extending longitudinally of the working path, a suction pipe for said pump having an inlet located in said gutter, and means connecting the outlet of said pump to said nozzle means.

8. In apparatus for polishing glass sheets, the improvement defined in claim 6, wherein said nozzle means is positioned along peripheral portions of a glass sheet extending transversely of said truck.

References Cited by the Examiner

UNITED STATES PATENTS

| | | | |
|---|---|---|---|
| 2,529,703 | 11/1950 | Nicoll et al. | 156—24 |
| 2,828,192 | 3/1958 | Langeld | 156—5 |
| 2,922,428 | 1/1960 | Wampler et al. | 134—122 |
| 3,023,139 | 2/1962 | Van Tetterode | 156—24 |
| 3,071,178 | 1/1963 | Howeth | 156—345 |

ALEXANDER WYMAN, *Primary Examiner.*

JACOB STEINBERG, *Examiner.*